United States Patent
Yuen et al.

(10) Patent No.: US 6,606,747 B1
(45) Date of Patent: *Aug. 12, 2003

(54) SYSTEM AND METHOD FOR GRAZING TELEVISION CHANNELS FROM AN ELECTRONIC PROGRAM GUIDE

(75) Inventors: Henry C. Yuen, Redondo Beach, CA (US); Roy J. Mankovitz, Encino, CA (US); Daniel S. Kwoh, La Canada-Flintridge, CA (US); Elsie Y. Leung, South Pasadena, CA (US)

(73) Assignee: Index Systems, Inc. (VG)

( * ) Notice: Subject to any disclaimer, the term of this patent is extended or adjusted under 35 U.S.C. 154(b) by 0 days.

This patent is subject to a terminal disclaimer.

(21) Appl. No.: 09/401,712

(22) Filed: Sep. 23, 1999

Related U.S. Application Data

(63) Continuation of application No. 08/952,382, filed as application No. PCT/US97/04233 on Mar. 14, 1997.
(60) Provisional application No. 60/024,598, filed on Aug. 29, 1996, and provisional application No. 60/013,371, filed on Mar. 15, 1996.

(51) Int. Cl.[7] .............................................. H04N 5/445
(52) U.S. Cl. ......................................... 725/40; 725/39
(58) Field of Search ................................. 348/906, 564, 348/565, 569, 570, 460; 725/39, 40, 41, 42, 43, 52, 56; H04N 5/455

(56) References Cited

U.S. PATENT DOCUMENTS

| | | | |
|---|---|---|---|
| 4,706,121 A | * 11/1987 | Young | |
| 5,479,268 A | * 12/1995 | Young et al. | |
| 5,528,304 A | * 6/1996 | Cherrick et al. | |
| 5,585,838 A | * 12/1996 | Lawler et al. | |
| 5,684,525 A | * 11/1997 | Klosterman | |
| 5,699,107 A | * 12/1997 | Lawler et al. | |
| 5,781,246 A | * 7/1998 | Alten et al. | |
| 6,002,394 A | * 12/1999 | Schein et al. | |
| 6,154,203 A | 11/2000 | Yuen et al. | 345/327 |

FOREIGN PATENT DOCUMENTS

| | | |
|---|---|---|
| CA | 2154385 | 1/1996 |
| JP | 2-143708 | 6/1990 |
| JP | 3-31006 | 5/1991 |
| WO | WO 95/01058 | 1/1995 |
| WO | WO 96/07270 A1 | 3/1996 |

OTHER PUBLICATIONS

Starsight Operating Guide, 17 Pages.*
International Preliminary Examining Authority, International Preliminary Examination Report, Jan. 9, 1998, 8 Pages.*

* cited by examiner

*Primary Examiner*—David E. Harvey
(74) *Attorney, Agent, or Firm*—Christie, Parker & Hale, LLP

(57) ABSTRACT

A television system comprises an electronic program guide (EPG) including a picture-in-picture (PIP) window and means for returning to a last channel viewed full screen (LCF) in a television viewing mode prior to entering the guide mode. The EPG displays a program list including a listing for the LCF and text identifying it as such. This last channel listing is positioned at the top of a program list area in the guide. The viewer returns directly to the LCF in the television viewing mode by setting a cursor to the last channel listing prior to exiting the guide mode. In guides including listings for future programs, the last channel listing remains in a designated position of the program list area. To return to the LCF from the guide mode, the viewer cursors to the last channel listing in the program list and then presses a GUIDE/TV button, designates the LCF as the default channel to which the system automatically tunes when exiting the guide mode, or presses a LAST CHANNEL button on the remote control unit to simultaneously exit the guide mode and tune the system to the LCF. Alternately, the system may employ separate television and PIP tuners. In the guide mode, the television input is switched to the PIP tuner and the television tuner remains tuned to the LCF. Thus, when the viewer reselects the television viewing mode, the program being telecast on the LCF is displayed full screen.

9 Claims, 7 Drawing Sheets

SYSTEM AND METHOD FOR GRAZING TELEVISION CHANNELS FROM AN ELECTRONIC PROGRAM GUIDE

CROSS-REFERENCE TO RELATED APPLICATIONS

This application is a continuation of U.S. Pat. No. 6,154, 203, filed May 4, 1998, which claims priority of PCT Patent Application No. PCT/US97/04233, filed Mar. 14, 1997 which claims prority of provisional Application No. 60/024, 598, filed on Aug. 29, 1996 and provisional Application No. 60/013,371, filed Mar. 15, 1996.

BACKGROUND OF THE INVENTION

This invention relates to the field of television and, more particularly, to a method and apparatus for switching between a television viewing mode and a program guide mode in which video programs and related text are displayed simultaneously on a television screen.

For a number of years television receivers have been equipped with picture-in-picture (PIP) capability. In PIP format, the moving, real time images of one television channel are displayed on the background of the screen and the moving, real time images of another television channel are displayed in a PIP window overlaid on a small area of the background. Because two channels are simultaneously displayed by the television receiver, two tuners are required. The viewer enters the PIP mode by pressing a PIP key of his or her controller. Then, the viewer can change either the channel of the background or the channel of the PIP by resetting the appropriate tuner. To reverse the background and PIP images, the viewer simply presses a SWAP key. To collapse the PIP window, the viewer again presses the PIP key.

Television program guides help television viewers select programs to watch. Such television program guides list the available television programs by day of the week, time of day, channel, and program title. For many years television program guides have been published in hard copy form. More recently, as illustrated by Levine U.S. Pat. No. 4,908, 713, television program guides have begun to take an electronic form. In other words, the schedule of program listings is stored in an electronic memory connected to the television receiver. The program listings are recalled from memory by the viewer on command for display on the television screen.

Despite the prevalence of television program guides, many viewers still make their program selections by switching the television tuner from channel to channel and observing on the screen what program is being received on the respective channels. This process is sometimes called "grazing."

Emanuel U.S. Pat. No. 5,161,019 discloses an automated form of channel grazing. A preselected group of channels are sequentially scanned by switching the tuner of the television receiver from channel to channel. A still image of the program received on each channel is stored in a memory. After all the channels have been scanned, the still images from all the channels are simultaneously displayed on the television screen. This process gives the viewer more information about the program choices in addition to that obtainable from a television program guide, namely, the displayed still images of the actual programs.

SUMMARY OF THE INVENTION

The present invention relates to a television system comprising in a guide mode an electronic program guide (EPG) which includes a PIP window for display of real time images and a last channel recall. The last channel recall provides the viewer means for returning from the guide mode to a last channel displayed full screen in a television viewing mode, or last channel full screen (LCF), prior to entering the guide mode. The EPG displays a vertically oriented program list which includes a listing for the LCF, and text identifying it as such. This last channel listing is positioned at the top of a program list area of an all channel guide. The viewer may return directly to the LCF in the television mode by setting a cursor in the all channel guide to the last channel listing immediately prior to exiting the guide mode.

The guide mode may include various types of guides. In guides which include listings for future programs, the last channel listing is positioned at a designated position of the program list area and remains in that position as the viewer scrolls through the other program listings in the program list. Preferably, this designated position is at the bottom of the program list area.

The system provides several options for returning to the LCF from the guide mode: the viewer may cursor to the last channel listing in the program list and then press a GUIDE/ TV button; the viewer may designate the LCF as a default channel to which the system automatically tunes when exiting the guide mode; or the viewer may press a LAST CHANNEL button on the remote control unit to control the system to automatically exit the guide mode and simultaneously tune the system to the LCF.

In an alternate embodiment, the system employs two tuners, one for use in the television viewing mode and the other for use by a PIP chip in the guide mode. In the guide mode, the television tuner remains tuned to the LCF. Thus, when the viewer reselects the television viewing mode, the program being telecast on the LCF is displayed full screen.

DESCRIPTION OF THE DRAWINGS

These and other features, aspects, and advantages of the present invention will become better understood with regard to the following description, appended claims, and accompanying drawings wherein:

DETAILED DESCRIPTION

Figure 1:
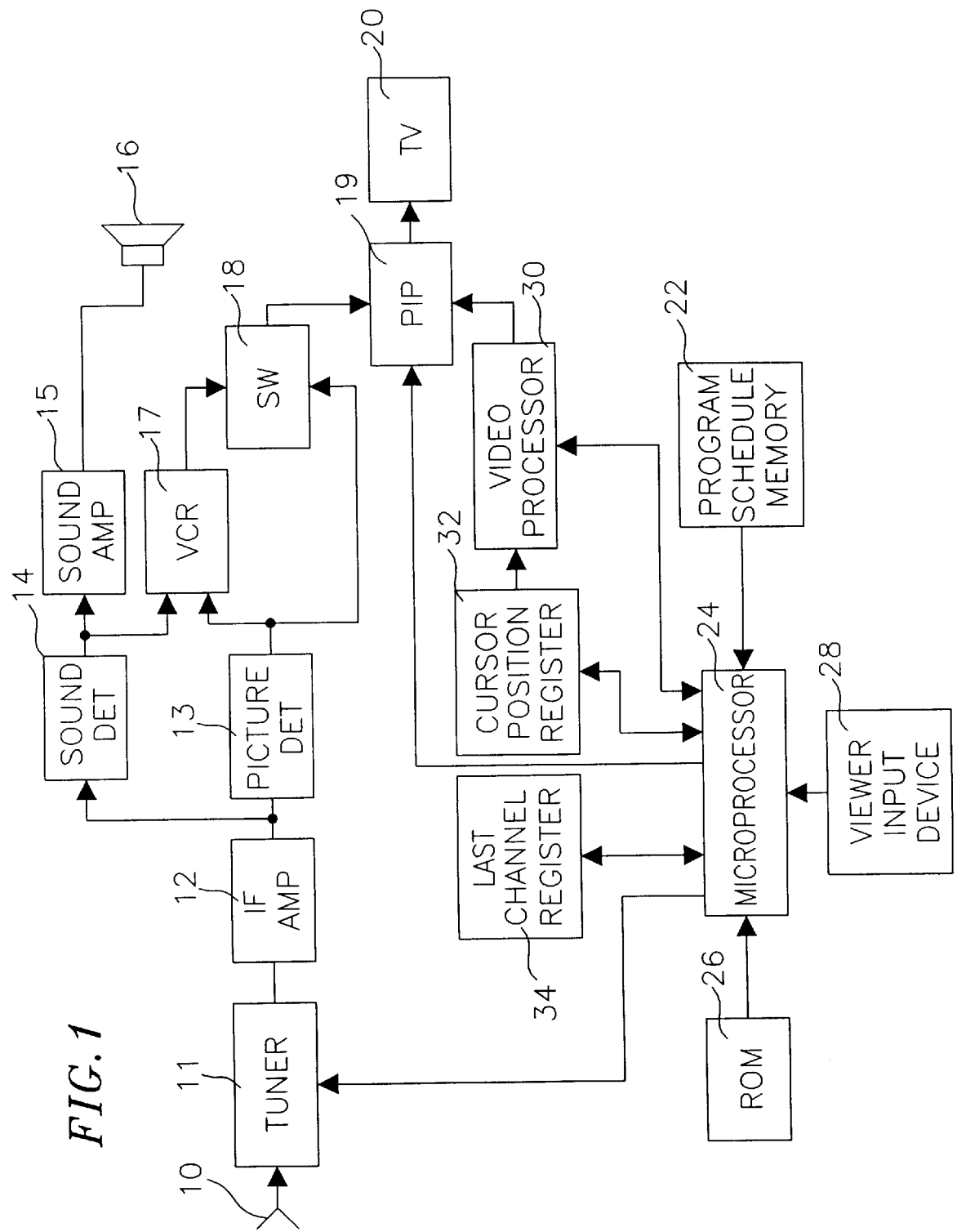
FIG. 1 is a schematic block diagram of a television receiver that has an electronic television program guide incorporating the principles of one embodiment of the invention.

This application is an improvement on application Ser. No. 08/475,395, filed Jun. 7, 1995, the disclosure of which is incorporated fully herein by reference, and International PCT Application No. US95/11173, filed Aug. 31, 1995 the disclosure of which is also fully incorporated herein by reference.

The above-referenced applications each describe a television system including an electronic television program guide (EPG) in which the moving images of a television program are displayed in a PIP window on the screen of a television monitor and textual information related to the television program is displayed in the background on the screen. Preferably, the audio portion of the television program displayed in the PIP window is also reproduced by the sound system of the television monitor. The textual information is arranged on the screen so none of it is covered by the moving images.

In one embodiment, the textual, program-related information is a television program schedule. One of the program listings of the schedule identifies, by title and time and/or channel, the television program in the PIP window, which displays moving images.

To facilitate channel grazing, a television viewer can use a PIP format for display of current television program listings from a program schedule data base in the background and moving, real time images of a program selected from the displayed listings in the PIP window. Specifically, as the viewer selects a particular program from the displayed current television program listings by means of a cursor or a code number, the corresponding program automatically appears in the PIP window. In this way, the viewer can channel graze by sequentially selecting the individual program listings in the background. When the viewer finds a program that the viewer wishes to watch, the viewer leaves the PIP format and returns to full screen television viewing, the tuner already being set to the desired program. To do this the viewer can reverse the background and PIP window and then collapse the window, leaving the desired program on the full screen, or the apparatus can be configured to return to full screen viewing in a single step.

To permit the viewing of programs scheduled for future broadcast without losing sight of the current program being watched, a television viewer can use a PIP format for display of television program listings for a specific channel or a specific time from a program schedule data base in the background and moving, real time images of the current program on that channel in the PIP window. Specifically, as the viewer changes channels, the current program on that channel automatically appears in the PIP window. Alternatively, the programs scheduled for future broadcast can be formatted by category. The viewer can control the background to display program listings for a period of days, e.g., a week, in the future. In this way, the viewer can continue to watch a television program while ascertaining the future programs on the channel to which the television tuner is set. When the viewer finds a program that the viewer wishes to watch, the background disappears, leaving the program on the channel to which the tuner is set on the full screen.

In the course of switching from the television viewing mode to the guide mode, navigating through the various guides available in the guide mode, and channel grazing in the guides, the viewer may forget which channel he or she was watching prior to entering the guide mode. Accordingly, it is desirable to provide the viewer a simple means for returning to the last channel he or she was viewing before entering the guide mode without having to rely on his or her memory and without having to navigate through several guides in the guide mode in order to identify and access that channel when switching back to the television viewing mode. A television system according to the present invention provides the viewer with a last channel recall feature which allows the viewer to return to the last channel displayed full screen from the guide mode.

FIG. 1 is a schematic block diagram of a television receiver that has an EPG. This receiver is the same as that described in the above-referenced patent applications, including reference numerals, with the addition of a last channel register 34. Microprocessor 24 is programmed to execute the functions described below. Although last channel register 34 functionally is a separate component, it could be incorporated into the random access memory (RAM) of microprocessor 24, not shown. Similarly, cursor position register 32 and program schedule memory 22 could be resident in the RAM of microprocessor 24. When the receiver is in the television viewing mode, the channel to which tuner 11 is set is stored in register 34. Each time tuner 11 is set to a new channel, the last channel data in register 34 is updated. Ordinarily, only the national channel name or identification, e.g., CBS, HBO, CNN, is stored in register 34. A local channel number is retrieved from the channel map memory for display on the screen.

Figure 2:
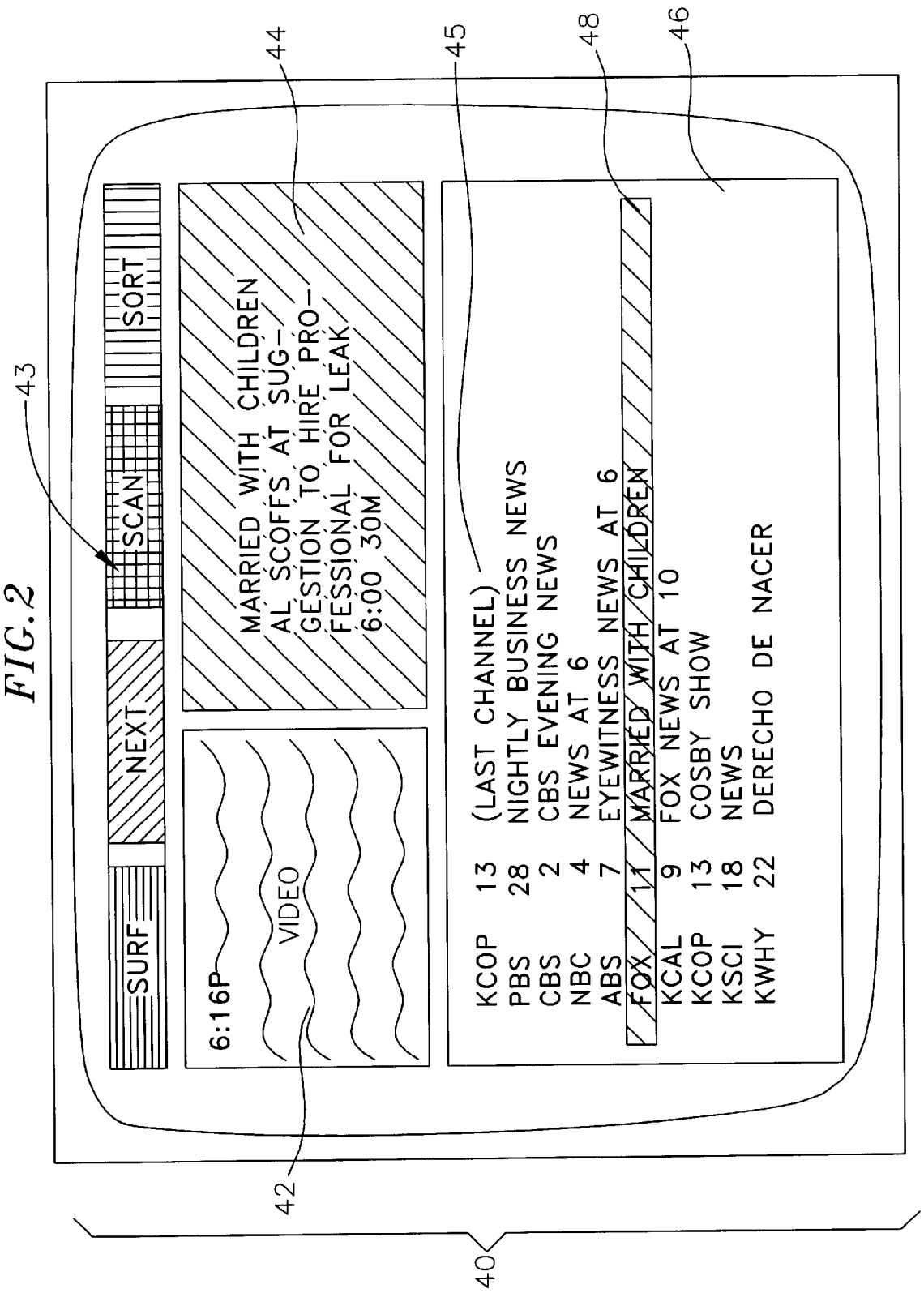
FIG. 2 is a television screen displaying a SURF guide formatted in accordance with the embodiment of FIG. 1.

FIG. 2 is a television screen display that is a modification of the all channel guide for current time (NOW) shown in FIG. 8 of the above-referenced applications. The modification vis-a-vis the above-referenced applications is a last channel listing 45 at the top of program schedule area 46, which is designated by the text "(Last Channel)". In banner 43, the designation "NOW" has been changed to "SURF", the designation "CHAN" has been changed to "NEXT", the designation "NEXT" has been changed to "SCAN", and the designation "SORT" remains the same. These and other modifications to the EPGs described in the above referenced applications are described in application Ser. No. 08/744, 399 filed on Nov. 7, 1996 (Attorney Docket No. 29666), the disclosure of which is incorporated fully herein by reference.

In program schedule memory 22, the program listings are coded by day of the week, time of day, and channel so that they can be accessed by the microprocessor 24 when necessary to supply program schedule information to the video processor 30 to compose the program listings and the program descriptions. The microprocessor 24 has a real time clock (not shown), the time of which is compared with the time of day and day of the week codes to select the program listings for the SURF guide. The functional storage areas of the cursor position register 32 are mapped to the storage areas of the video processor 30 where the program schedule is formatted for display on background area 40 so the cursor position register 32 points to the area of the screen, and thus the particular program, that is highlighted by the cursor 48. At the same time, the microprocessor 24 operates the switch 18 so the output of the tuner 11 is directly connected to the one input of the PIP chip 19 and switches PIP chip 19 into a PIP mode, such that the input from the tuner 11 is displayed in PIP window 42 and the program schedule from the video processor 30 is displayed in background 40. The microprocessor 24 senses the channel to which the tuner is set when the SURF guide is entered, and initially positions the cursor 48 at the program listing broadcast on this channel. As the viewer moves the up/down arrows of the cursor control key set, the tuner 11 is reset accordingly and new program schedule information is fed through the microprocessor 24 to the video processor 30 to recompose the program listings so the cursor 48 remains visible and the program description remains current. By comparing the cursor position in the register 32 with the channel corresponding to the highlighted area of the video processor 30, the channel of the highlighted program is derived and coupled to the microprocessor 24. The microprocessor 24 then sets the tuner 11 to this channel. The described mode facilitates channel grazing by the viewer. When the viewer finds the video program he or she wishes to watch, the viewer leaves the EPG. As a result, the microprocessor 24 switches the PIP chip 19 out of the PIP mode, such that the video program inputted from the tuner 11 is displayed full screen.

Microprocessor 24 is configured to retrieve the data in last channel register 34 and to couple the retrieved data to video processor 30 to be incorporated into the formatted display shown in FIG. 2 as last channel listing 45 when the viewer enters the guide mode. It should be noted that it is not necessary to retrieve the associated title data because the program is simply identified as "(Last Channel)". The listing for the same channel is also displayed in its regular order in the program listings with the title information.

According to a presently preferred embodiment, when entering the guide mode from the television viewing mode, the system automatically displays the SURF guide (FIG. 2). Microprocessor 24 is configured to position cursor 48 on last channel listing 45 and to display the program being broadcast on the last channel, i.e., "The Cosby Show" on KCOP 13, as the real time video image in PIP window 42. In operation, to display a different channel in PIP window 42, the viewer moves cursor 48 to a different entry in area 46. For example, to view "Married With Children" on FOX channel 11, cursor 48 highlights this entry and microprocessor 24 is configured to set tuner 11 to that channel.

Figure 6:
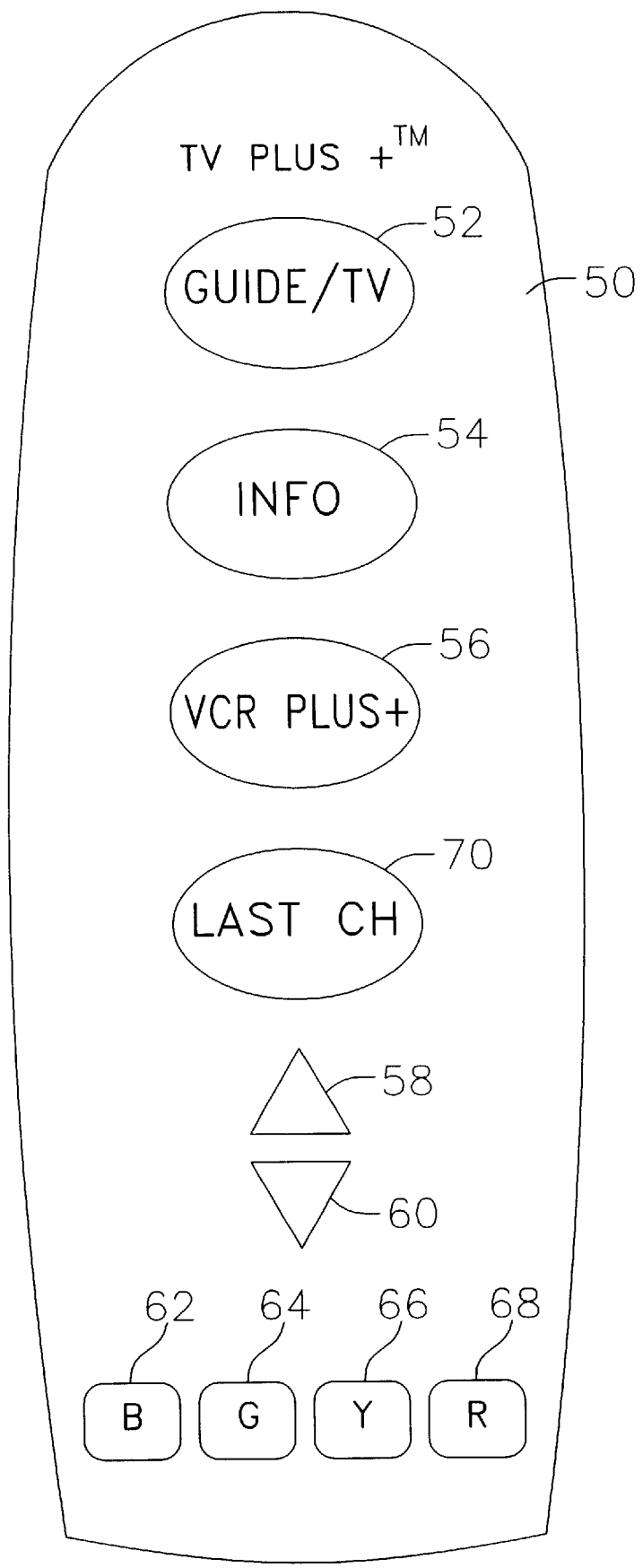
FIG. 6 is a top plan view of a remote control unit for operating the electronic program guide.

While the system is in the guide mode, the data in last channel register 34 does not change. Microprocessor 24 is configured to set tuner 11 to the channel marked by cursor 48. When the viewer returns to the television viewing mode from the guide mode, the setting of the tuner 11 is not changed so the program last displayed in banner 43 is displayed full screen. Thus, if the viewer wishes to return to the channel that the viewer was last watching in the television viewing mode, the viewer moves cursor 48 to the top of area 46 to highlight last channel listing 45 and then automatically returns to the television viewing mode by pressing GUIDE/TV button 52 on a remote control unit 50, as shown in FIG. 6, which may function as viewer input device 28 (FIG. 1). When the GUIDE/TV button is pressed, the channel data in register 34 is retrieved by microprocessor 24 and transmitted to tuner 11 to set tuner 11 to the last channel, e.g., KCOP 13 in the case illustrated in FIG. 2. If the viewer instead wishes to watch a different channel upon return to the television viewing mode, the viewer moves cursor 48 to highlight the entry in area 46 that identifies the desired channel and then automatically returns to the television viewing mode by pressing the GUIDE/TV button. When the GUIDE/TV button is pressed this time, the channel data in video processor is retrieved by microprocessor 24 and transmitted to tuner 11 to set tuner 11 to the highlighted channel, e.g., FOX 11, in the case illustrated in FIG. 2.

Figure 3:
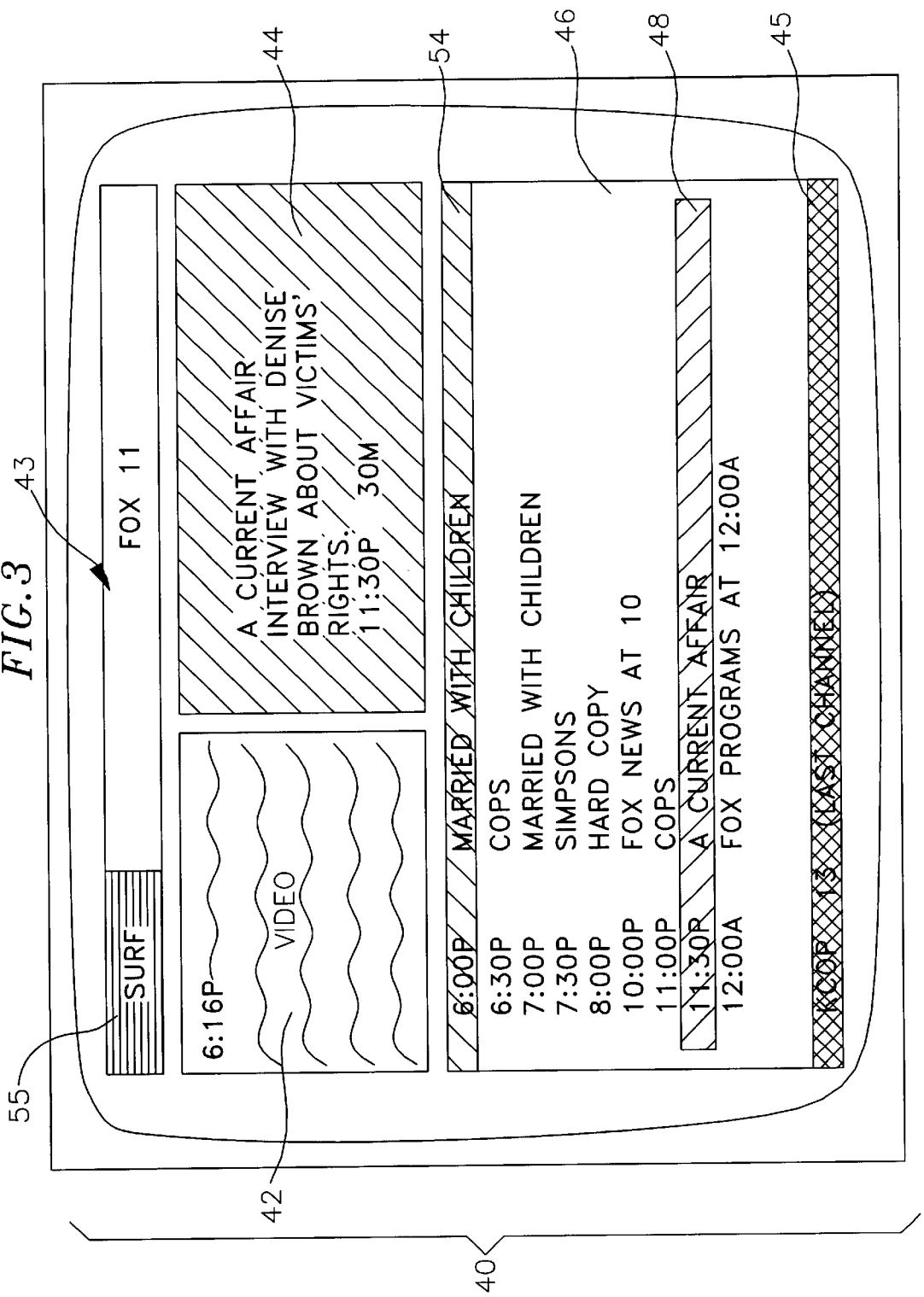
FIG. 3 is a television screen displaying a NEXT guide formatted in accordance with another embodiment.

The viewer may enter any of the other program guides for the SURF guide screen. The on-screen options are located in banner 43 and include a green NEXT prompt, a yellow SCAN prompt and a red SORT prompt. In FIG. 3, a version of a screen format for the NEXT guide is shown. All the program listings for the channel highlighted immediately before leaving the SURF guide, i.e., FOX Channel 11, are displayed in area 46, from the currently broadcast program into the future for a specified time period, e.g., 24 hours or until the end of the next day. This last channel highlighted before exiting the SURF guide is hereinafter referred to as the "last channel surfed" or "LCS". Area 46 has a column for time and a column for program title; each line of area 46 represents a separate program listing. The moving, real time images of the current television program on the channel are displayed in the PIP window 42. If the cursor also highlights this program, a brief program description of that program is displayed in area 44. If the cursor highlights another program listing, as shown in FIG. 3, a brief program description of the highlighted program is displayed in area 44. The program being displayed on the LCS always remains displayed in the PIP window 42 as the viewer navigates through the SCAN guide. The viewer may return to the SURF guide by selecting the blue SURF prompt 55 in banner 43.

According to the presently preferred embodiment, only the SURF guide includes the last channel listing 45. In order to utilize the last channel feature, the viewer must return to the SURF guide and select last channel listing 45 with cursor 48 prior to exiting the guide mode.

Figure 4:
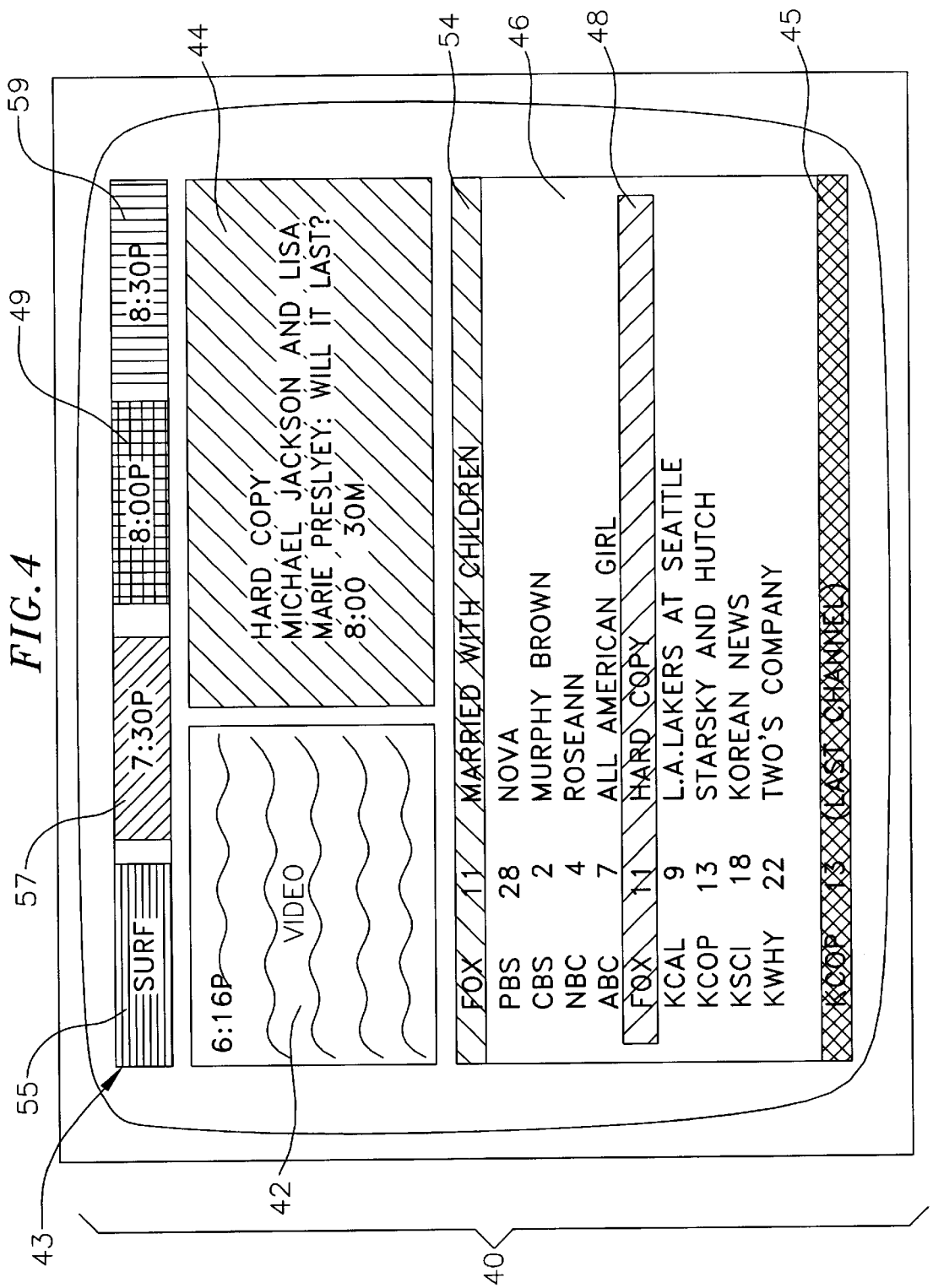
FIG. 4 is a television screen displaying a SCAN guide formatted in accordance with the embodiment of FIG. 3.

In FIG. 4, a version of a screen format for the SCAN guide is shown. From this menu, the viewer can select the future time of the program listings to be displayed at intervals such as one-half hour. The selected future time, i.e., 8:00 p.m., for the program listings displayed in area 49 is shown in banner 43. A brief program description of the program listing highlighted in area 46 by the cursor 48 is displayed in area 44. The time slot of the SCAN guide can be incremented by one-half hour to 8:30 p.m. by selecting the red 8:30P prompt 59 in banner 43. Conversely, the viewer can scan back one-half hour to 7:30 p.m. by selecting the green 7:30P prompt 57 in banner 43. By way of example, if the television program schedule for 8:00 p.m. is currently displayed in area 46 and the viewer selects the green 7:30P prompt 57, the television program schedule for 7:30 p.m. will be displayed in area 46 and 7:30P will be displayed in subarea 49 of banner 43. The green on-screen prompt 57 will change to 7:00P and the red on-screen prompt 59 will change to 8:00P so that the viewer has the option of scanning forward or backward in time by one-half hour with a single touch of the corresponding colored button on the remote control unit 50. Here also, the program being displayed on the LCS always remains displayed in the PIP window 42 as the viewer navigates through the SCAN guide. The viewer may return to the SURF guide by selecting the blue SURF prompt 55 in banner 43.

Figure 5:
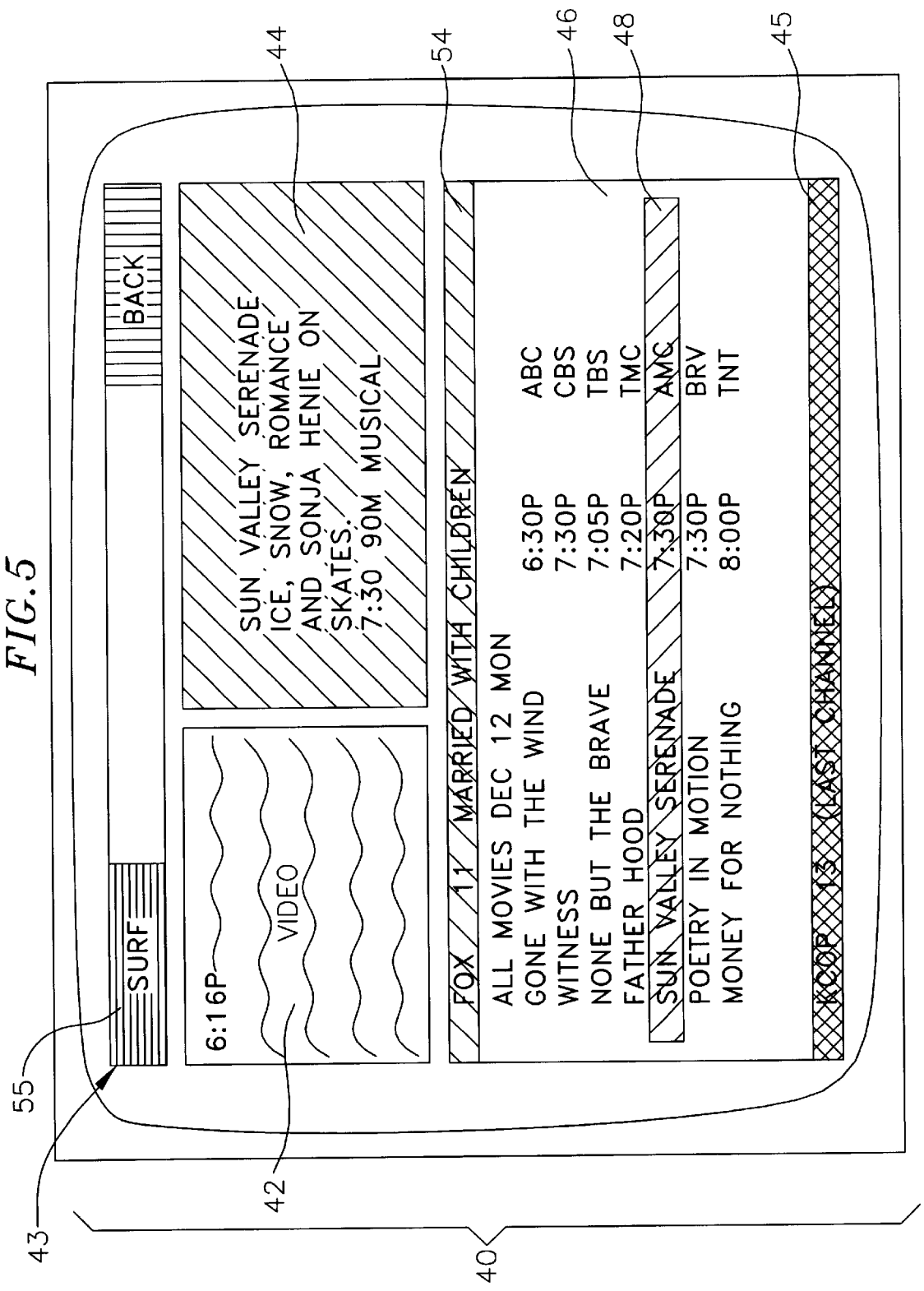
FIG. 5 is a television screen displaying a SORT guide formatted in accordance with the embodiment of FIG. 3.

In FIG. 5, a version of a screen format for the "SORT" guide is shown. A list of various categories, i.e., movies, sports, variety, are displayed in area 46. Again, the program being displayed on the LCS always remains displayed in the PIP window 42 as the viewer navigates through the SCAN guide, and the viewer may return to the SURF guide by selecting the blue SURF prompt 55 in banner 43.

As shown in FIGS. 3 to 5, each of the NEXT, SCAN, and SORT guides include a program listing 54 for the current television program displayed in the PIP window 42, i.e., the program being displayed on the LCS. This listing is hereinafter referred to as the "PIP listing". Many times, a given program list will contain more program listings than may be displayed in area 46. Accordingly, only a portion of the program listings available in the guide will be displayed at one time, with "hidden" program listings being displayed as the viewer scrolls through the program list. The PIP listing 54 is positioned on the top line of area 46 and remains at this position even as the viewer scrolls through the program listings available in the respective guide. Preferably, the PIP listing is on a background having a different color or shade than the cursor 48.

According to a presently preferred embodiment, GUIDE/TV button 52 on remote control unit 50 (FIG. 6) allows the viewer to toggle between the television viewing mode and the guide mode. Thus, the viewer may exit any of the guides by pressing the GUIDE/TV button. The program displayed in the PIP window 42 will be displayed full screen upon entering the television viewing mode, that is, the program currently being telecast on the LCS.

As described above, when entering each of the NEXT (FIG. 3), SCAN (FIG. 4), and SORT (FIG. 5) guides from the SURF guide (FIG. 2), the tuner 11 remains set to the LCS, so that the moving real time images of the television program viewed from the SURF guide remains in the PIP window 42 for uninterrupted viewing. Also, in each of these guides, the PIP listing 54 is displayed at the top of area 46. In an alternate embodiment according to the present invention, area 46 may include the last channel listing 45, providing the viewer with the last channel recall feature in any of these guides. This channel is hereinafter referred to as the last channel full screen or "LCF". As in the SURF guide, the text designating the LCF in the last channel listing 45 is "(Last Channel)".

It is desirable to position the PIP listing 54 at the top of area 46 to clearly identify which program is being displayed. It is also desirable to display the last channel listing 45 in a fixed position in area 46 separate from the other program listings. According to one embodiment, area 46 in each of the NEXT, SCAN, and SORT guides is arranged such that PIP listing 54 is at the top of area 46 and last channel listing 45 is at the bottom of the list. These listings remain in their designated positions even as the viewer scrolls through the other program listings in the respective guide. Preferably, the last channel listing 45 is highlighted a different color or shade than the cursor 48 or the PIP listing 54. The last channel listing is generated in the same manner as described above for the SURF mode. The viewer may cursor to any listing in area 46 including the PIP listing 54 and the last channel listing 45.

In one embodiment, the tuner remains tuned to the LCS in the NEXT, SCAN, and SORT guides regardless of which listing is selected with the cursor. Therefore, in these guides, the program being displayed in the PIP window 42 does not change. In this embodiment, to utilize the last channel recall feature, the viewer pushes the GUIDE/TV button to exit the guide mode while the cursor is positioned on the last channel listing 45, which controls the microprocessor to retrieve the channel designation for the LCF from the last channel register 34 and to control the tuner to tune the LCF. Hence, the program being telecast on the LCF is displayed full screen upon returning to the television viewing mode. However, if any other listing is selected at the time the viewer exits the guide mode, the tuner will remain tuned to the LCS, and the program displayed in the PIP window prior to exiting the guide mode will be displayed full screen in the television viewing mode. Hence, the LCS is the default channel when switching to the television viewing mode. In an alternate embodiment, the default channel may be designated as either the LCS or LCF by the viewer during system set-up.

In another alternate embodiment, the viewer may toggle between the programs telecast on the LCS and LCF in the PIP window 42. According to this embodiment, while in the NEXT, SCAN, or SORT guides, the microprocessor 24 controls the tuner 11 to tune the LCF when the cursor is set to last channel listing 45 so that the television program on the LCS displayed in PIP window 42 is replaced by the program last displayed full screen. The tuner will remain tuned to the LCF until the PIP listing 54 is selected. This affords the viewer the option of toggling between the program being telecast on the last channel he or she selected before entering the guide mode and the last channel he or she selected while channel grazing in the SURF guide mode. Preferably, the colors of the PIP listing 54 and last channel listing 45 highlighting are exchanged, but their respective positions in area 46 are not.

According to yet another embodiment of the present invention, returning to the LCF in the television viewing mode from any guide is facilitated by the inclusion of a LAST CHANNEL button 60 on remote control unit 50. In a television viewing mode, a last channel button is commonly used to toggle between a currently tuned channel and previously tuned channel. According to the present invention, the LAST CHANNEL button 60 may also be used to return to the television viewing mode from any guide, i.e., SURF, NEXT, SCAN, or SORT, while simultaneously tuning the tuner 11 to the LCF. The viewer thus has two viewing options when exiting the guide mode, either pressing the LAST CHANNEL button to return to the LCF in the television viewing mode, or pressing the GUIDE/TV button to return to the LCS in the television viewing mode.

Figure 7:
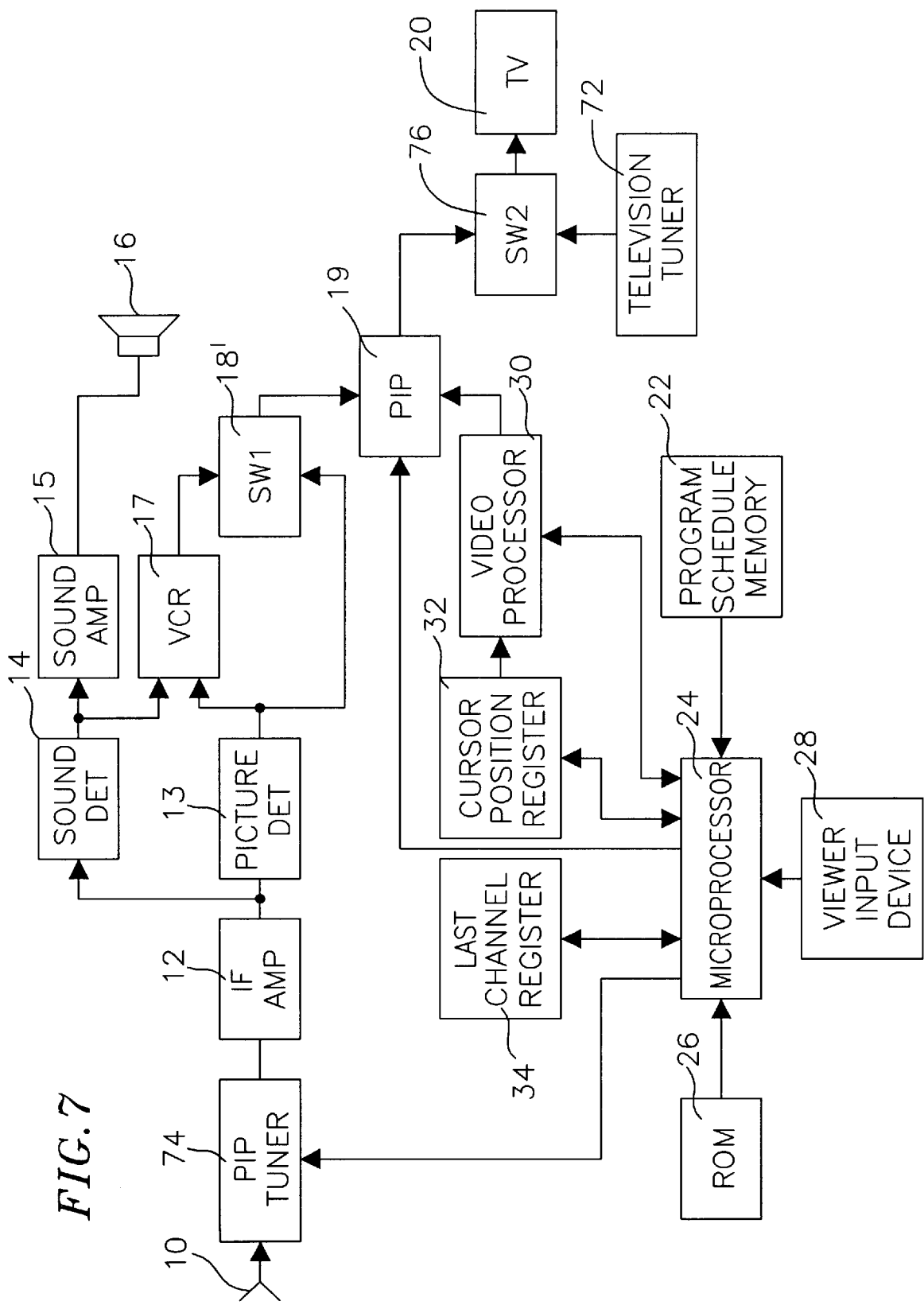
FIG. 7 is a schematic block diagram of yet another embodiment of the invention.

In the embodiments described above, the microprocessor 24 controls a single tuner 11 to display a program in both the television viewing mode and the guide mode, and the LCF is stored in a memory such as a RAM connected to the microprocessor. FIG. 7 is a schematic block diagram of a television system according to the present invention utilizing two tuners to provide last channel recall feature. According to this embodiment, the LCF is stored in a television tuner 72 which tunes channels in the television viewing mode. Depending on they type of tuner employed, the LCF may be stored in television tuner 72 mechanically or in the phase-locked loop of the tuner. In the guide mode, a separate PIP tuner 74 tunes channels for display in the PIP widowand the television tuner 72 remains tuned to the LCF. Since the television tuner remains tuned to the LCF, upon return to the television mode from the guide mode, the program being telecast on the LCF is automatically displayed full screen.

Although certain preferred embodiments of the present invention have been described herein, many modifications and variations will be apparent to those skilled in the art. It is therefore to be understood that the scope of the invention should be limited only by the appended claims.

What is claimed is:

1. A method for channel grazing from an electronic program guide of a television apparatus having a screen, a tuner, and a memory, the method comprising:
storing a plurality of program listings in the memory;
changing to a program guide mode in which a portion of the program listings are displayed on the screen;
storing a channel tuned to by the tuner prior to changing to the program guide mode as a last channel;
displaying the last channel as a last channel listing with the program listings in the guide mode;
selecting one of the displayed program listings;
setting the tuner to a channel carrying a first program indicated by the selected program listing;
displaying the first program in a PIP window in the guide mode;
selecting the displayed last channel listing;
setting the tuner to the last channel; and
changing to a television viewing mode to display a second program carried by the last channel in a full screen format.

2. The method of claim 1, wherein the last channel listing remains in a fixed position on the screen.

3. The method of claim 1 further comprising changing the displayed program listings while continuing to display the last channel listing.

4. A system for channel grazing from an electronic program guide of a television apparatus, the system comprising:
- means for storing a plurality of program listings in the memory;
- means for changing to a program guide mode in which a portion of the program listings are displayed on the screen;
- means for storing a channel tuned to by the tuner prior to changing to the program guide mode as a last channel;
- means for displaying the last channel as a last channel listing with the program listings in the guide mode;
- means for selecting one of the displayed program listings;
- means for setting the tuner to a channel carrying a first program indicated by the selected program listing;
- means for displaying the first program in a PIP window in the guide mode;
- means for selecting the displayed last channel listing;
- means for setting the tuner to the last channel; and
- means for changing to a television viewing mode to display a second program carried by the last channel in a full screen format.

5. The system of claim 4 further comprising means for maintaining the last channel listing in a fixed position on the screen.

6. The system of claim 4 further comprising means for changing the displayed program listings while continuing to display the last channel listing.

7. A system for channel grazing from an electronic program guide of a television apparatus, the system comprising:
- a memory for storing a plurality of program listings;
- a tuner for tuning to a channel;
- means for changing to a program guide mode;
- a last channel register coupled to the memory, the last channel register storing the channel tuned to by the tuner prior to changing to the program guide mode;
- a screen coupled to the memory and the last channel register, the screen displaying the last channel as a last channel listing with the program listings in the guide mode;
- means for selecting one of the displayed listings;
- a microprocessor coupled to the tuner and the means for selecting, the microprocessor setting the tuner to the channel carrying a program indicated by the selected listing; and
- a PIP chip coupled to the microprocessor, the PIP chip displaying a program being telecast on the channel to which the tuner is set.

8. The system of claim 7 wherein the tuner is set to the last channel in the last channel register.

9. The system of claim 7 further comprising means for changing to a television viewing mode to display the program being telecast on the channel to which the tuner is set in a full screen format.

\* \* \* \* \*